United States Patent [19]

Spier

[11] Patent Number: 4,976,567

[45] Date of Patent: Dec. 11, 1990

[54] CONNECTOR FOR CORRUGATED MATERIALS

[76] Inventor: I. Martin Spier, 50 Park Ave., New York, N.Y. 10016

[21] Appl. No.: 367,238

[22] Filed: Jun. 16, 1989

[51] Int. Cl.$^5$ ............................................. F16D 1/00
[52] U.S. Cl. .............................. 403/407.1; 403/406.1; 24/297
[58] Field of Search ......................... 403/407.1, 406.1; 24/297; 248/221.4

[56] References Cited

U.S. PATENT DOCUMENTS

| | | | |
|---|---|---|---|
| 4,389,133 | 6/1983 | Oberst | 403/407.1 X |
| 4,393,561 | 7/1983 | Yuda | 24/297 |
| 4,565,465 | 1/1986 | Oberst | 403/407.1 |
| 4,681,288 | 7/1987 | Nakamura | 248/221.4 X |
| 4,708,895 | 11/1987 | Mizusawa | 24/297 X |
| 4,815,685 | 3/1989 | Roberts et al. | 24/297 X |

Primary Examiner—Andrew V. Kundrat

[57] ABSTRACT

A connector for corrugated materials includes a first member which has a base member which is held between a pair of panels of corrugated material and a projecting member which has a pair of apertures and which projects outwardly from a slot in one of the panels of corrugated material. A second member has a base plate which is held between a second pair of panels of corrugated material and a plurality of guide fingers some of which enter into the apertures of the first member and some of which enter these apertures and also hook onto the first member thereby locking the second pair of panels onto the first pair of panels. In order to provide additional engagement between the first and second members, the first member is provided with a pair of projecting plates which engage a pair of apertures on the second member when the first and the second members are connected.

12 Claims, 3 Drawing Sheets

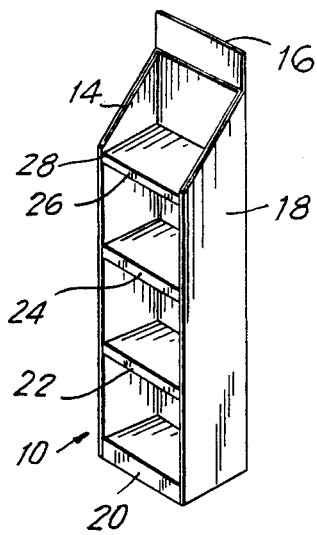
FIG. 1
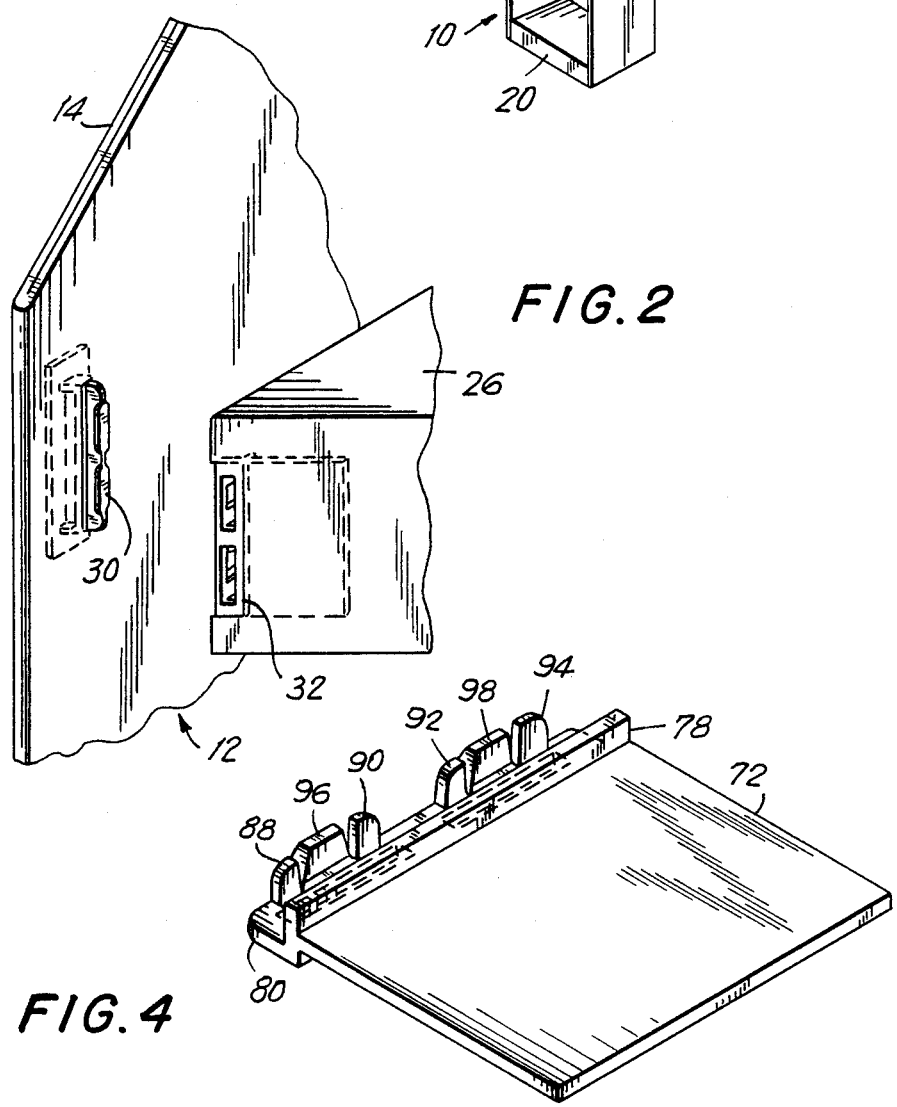
FIG. 2
FIG. 4

CONNECTOR FOR CORRUGATED MATERIALS

BACKGROUND OF THE INVENTION

Conventional assemblies and structures such as display cases and the like made of corrugated cardboard panels typically use a type of construction known as a slot and hook construction. In this type of construction, when there is a need to connect two panels one of the panels is provided with a rectangular slot and the second is provided with a hook portion. The hook portion is formed by cutting away selected areas of the edge of the panel leaving a hook portion which is an integral portion of the panel. In use, the hook portion is inserted into the slot thereby connecting the two panels.

The conventional construction is subject to numerous deficiencies among which is the inherent weakness of the hook portions. After several cycles of assembly, disassembly, storage and reassembly of a display case using the conventional hook and slot construction, the hook portions tend to weaken and tear thereby rendering the entire display case unusable. An additional disadvantage of the conventional method of construction is related to the method of fabrication of the hook portions. Each hook portion is formed on the edge of a panel by cutting away selected portions of the panel edge. This results in a significant portion of the corrugated panel material being wasted as scrap.

OBJECTS OF THE INVENTION

It is an object of the present invention to provide a connector for corrugated materials which overcomes the disadvantages of the prior art and results in a reliable and reusable connection between panels of corrugated material.

Another object of the present invention is to provide a connector for corrugated material which overcomes the disadvantage of the prior art be minimizing the waste of scrap portions of the panels being joined.

Another object of the invention is to provide a connector for corrugated materials which can be easily assembled using a minimum amount of labor.

Still another object of the present invention is to provide a connector for corrugated materials which can be easily molded in large quantities using a relatively low cost plastic material resulting in a relatively low unit cost.

SUMMARY OF THE INVENTION

In accordance with the present invention, there is provided a connector for corrugated materials which comprises a first member and a second member. The first member has a base portion and a projecting portion with the projecting portion being disposed substantially perpendicular to the base portion. The projecting portion has a pair of apertures, and a pair of projecting members disposed adjacent to the apertures and disposed perpendicular to the projecting portion.

The second member has a base plate and a purality of projecting fingers disposed at the edge of the base plate. The second member also includes a pair of apertures disposed adjacent to the projecting fingers. The apertures in the first member are proportioned to receive the projecting fingers in the second member. In a similar manner, the apertures in the second member are proportioned to receive the projecting portions on the first member.

At least one of the projecting fingers has an end which has a ramp portion which hooks onto the first member when the first and second members are engaged.

In use, the first member projects from a slot formed in a first corrugated panel with the base portion of the first member held captive between a pair of sheets of corrugated material which form the first panel. In a similar manner, the second member projects from the edge of a second panel with the base plate of the second member being held between a pair of sheets of corrugated material which form the second panel.

BRIEF DESCRIPTION OF THE DRAWINGS

Additional objects and advantages of the invention will become apparent during the course of the following specification, when taken in connection with the drawings, in which:

FIG. 1 is an overall perspective view of a display stand made of corrugated material which incorporates a connector for corrugated materials made in accordance with the present invention;

FIG. 2 is a fragmentary exploded view of a portion of the display stand of FIG. 1 showing the connector for corrugated materials in the disassembled state;

FIG. 3 is a perspective view of the connector for corrugated material of FIG. 2 with the connector shown removed from the corrugated materials;

FIG. 4 is a bottom perspective view of one of the portions of the connector for corrugated materials of FIG. 2;

DETAILED DESCRIPTION OF THE INVENTION

Figure 5:
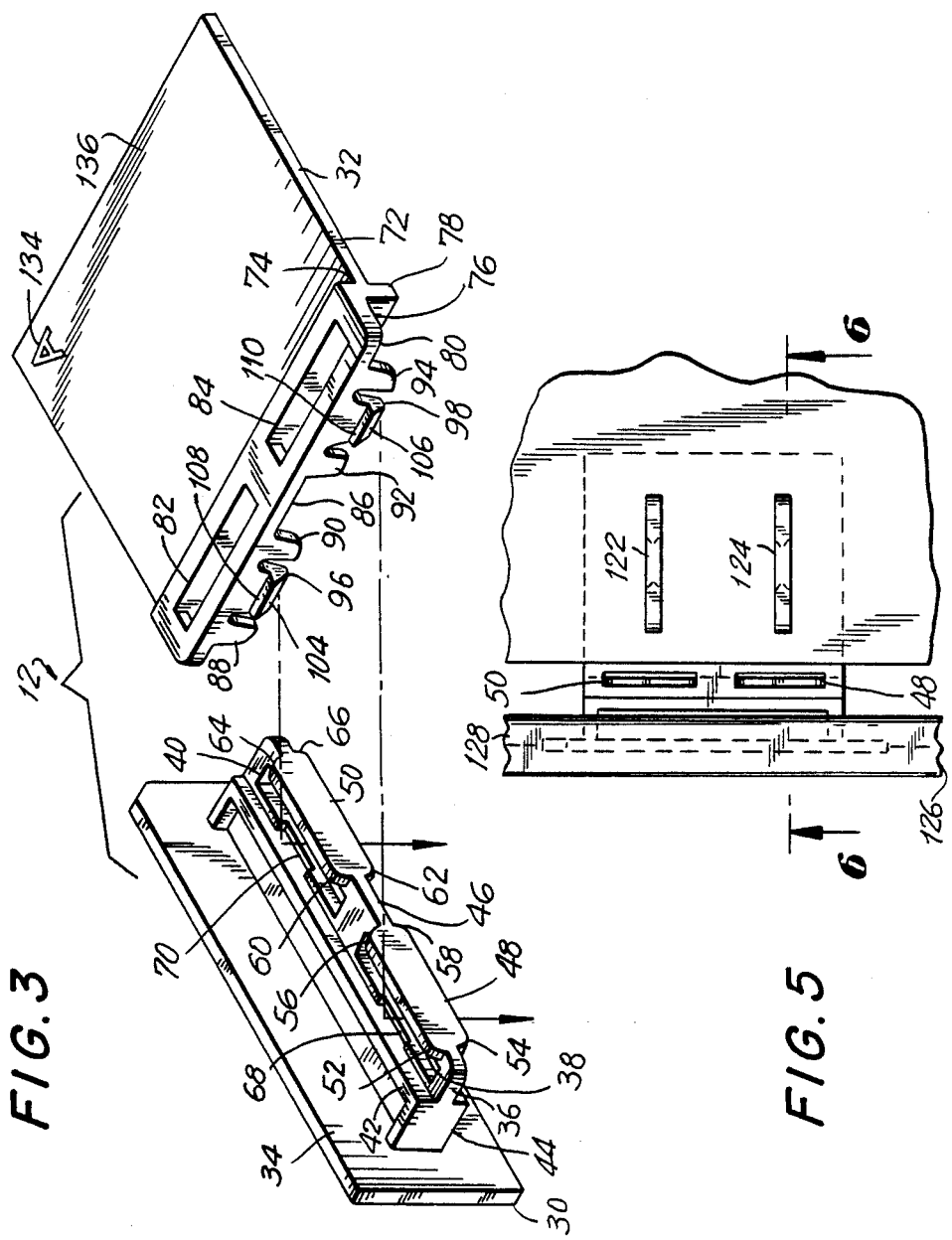
FIG. 5 is a fragmentary elevation view of the connector for corrugated materials of FIG. 2.

With reference to the drawing, there is shown in FIGS. 1 and 2 a display case 10 made of corrugated material which incorporates a plurality of identical connectors for corrugated materials, each made in accordance with the present invention, one of which is designated by the reference numeral 12 in FIG. 2. The display case 10, comprises an assembly of vertically disposed panels 20,22,24,26 which form shelves for the storage and display of various types of items. The vertical and horizontal panels 14,16,18,20,22,24,26 are removably held together by the connectors 12, according the the present invention, in a manner which will be presently described in detail.

The connector for corrugated materials 12 shown in FIG. 2 is located in the area designated by the reference numeral 28 in FIG. 1.

As is best shown in FIG. 3, the connector for corrugated materials 12 includes a first member 30 and a second member 32. The first member 30 is attached to the vertical panel 14 and the second member 32 is attached to the horizontal panel 26 in a manner which will be presently described.

The first member 30 comprises a base portion 34 and a projecting portion 36. The projecting portion 36 is substantially perpendicular to the base portion 34 and includes a pair of rectangular slots 38,40. The projecting portion 36 also includes a pair of rib portions 42,44 which project, one each, above and below the projecting portions 36 and thereby add strength to the first member 30. The outer edge 46 of the projecting portion 36 includes a pair of plate portions 48,50 which are disposed substantially perpendicular to the projecting protion 36.

The plate portions 48,50 are symmetrically located with respect to the projecting portion 36 with the plate portions 48,50 projecting equally above and below the projecting portion 36. The corners 52,54,56,58,60,62,64,66 of the plate portions 48,50 are rounded to facilitate assembly of the connector 12. The projecting portion 36 also includes four symmetrically located detent portion two of which are shown in FIG. 3 and are designated by the reference numerals 68,70.

The second member 32 comprises a rectangular base plate 72 on one edge of which there is an integrally formed step portion 76. The step portion 76 comprises a first portion 78 which is substantially perpendicular to the base plate 72 and a second portion 80 which is substantially parallel to the base plate 72. The second portion 80 includes a pair of rectangular slots 82,84 which are proportioned to receive portions of the projecting plates 48,50 of the first member 30 when the first and the second member 30,32 are assembled.

The outer edge 86 of the second portion 80 includes four guide fingers 88,90,92,94 and two flexing fingers 96,98. The guide fingers 88,90,92,94 are disposed substantially in alignment and are proportioned so that two guide fingers 88,90 can enter the rectangular slot 40 and two guide fingers can enter the rectangular slot 38 when the first and the second members 30,32 are assembled. The ends of each of the guide fingers 88,90,92,94 are rounded to facilitate entry into the slots 38,40. The flexing fingers 96,98 are disposed, one each, between the guide fingers 88,90 and between the guide fingers 92,94.

Each of the outer ends 100,102 of the flexing fingers 96,98 have outwardly inclined portions 104,106 and wall portions 108,110 which form ramp-like portions which act like hooks engaging the detent portions 68,70 of the first member 30 when the first and second members 30,32 are assembled.

Figure 6:
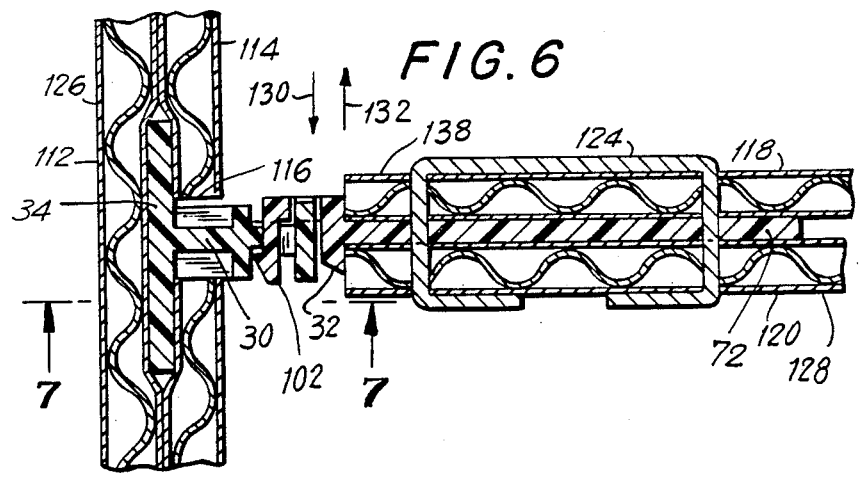
FIG. 6 is a sectional view taken along the line 6—6 of FIG. 5.
Figure 7:
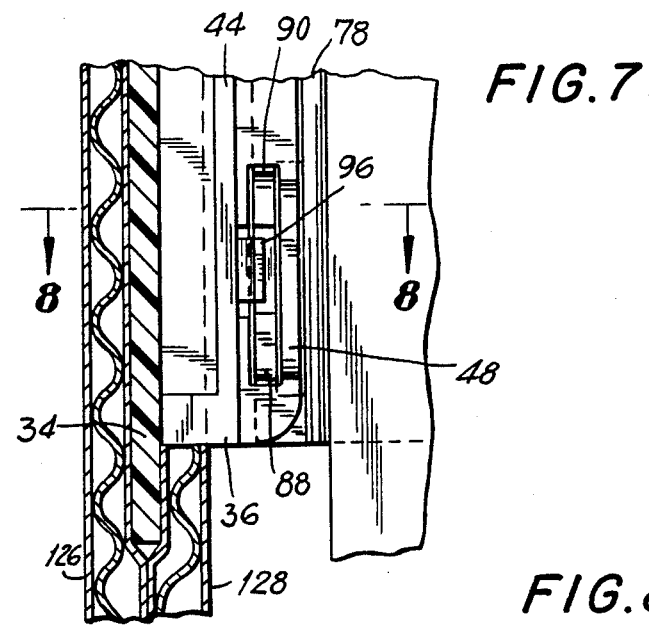
FIG. 7 is a fragmentary sectional view taken along the line 7—7 of FIG. 6.

In use, the first member 30 is mounted in a structure, such as the display rack 10 shown in FIG. 1, with the base portion 43 being held between two sheets of corrugated material 112,114 which form the panel 126 as is best shown in FIG. 6. The sheet 114 includes a rectangular slot 116 through which the projecting portion 30 projects. The rectangular slot 116 is proportioned to allow the projecting portion to extend throught the slot 116 while holding the base portion captive between the two sheets 112,114.

The base plate 72 of the second member 34 is mounted between two sheets of corrugated material 118,120 as is shown in FIG. 6 and is retained by a pair of staples 122,124. As shown in FIG. 5, the staple 122,124 which pierces the sheets 118,120 and the base plate 72 hold the sheets 118,120 and the base plate 72 together. In an alternative construction which is not shown, the sheets 118,120 and the base plate 72 may be held together by a single staple. The two sheets 118,120 form the panel 128.

The panel 126 which retains the first member 30 and the panel 128 which retains the second member 32 may be joined together by engaging the first and second members 30,32. The first and second members 30,32 are joined by inserting the plates 48,50 into the slots 82,84 and the guide fingers 88,90,92,94 and the flexing fingers 96,98 into the slots 38,40. Pressing the first and second members 30,32 together in the direction shown by the arrow 130 in FIG. 6 causes the ramp-like ends 100,102 of the flexing fingers 96,98 of the second member 32 to ride onto and hook onto the detent protions 68,70 of the first member 30 thereby connecting the first and second members 30,32 together in a secure manner. By appropriately locating and engaging a plurality of connectors 12, each according to the present invention, a structure of any desire configuration can be rapidly assembled.

When it is desired to disassemble the connector 12, the first and second members 30,32 are pulled apart in the direction indicated by the arrow 132 in FIG. 6. The flexing fingers 96,98 flex sufficiently to disengage the ends 100,102 from the detent portions 68,70 and the first and second members 30,32 are easily separated. In this manner a structure which utilizes connectors 12 according to the present invention may be disassembled for the purposes of storage when no longer needed then reassembled.

The first and second members are each unitary members which are molded in a plastic material. As a matter of convenience and indicia such as the letter A as indicated by the reference numeral 134 in FIG. 3 may be formed on the surface 136 of the second member 32 during the molding process. The indicia 134 aids in properly orienting the second member 32 during the assembly of the panel 128 which is shown in FIG. 6 so that the guide fingers 88,90,92,94 and flexing fingers 96,98 are directed in a downward direction. This orientation enables the top surface 138 of the panel 128 to support a load while the second member 32 is supported by the projecting portion 36 of the first member 39 in a secure member.

Figure 8:
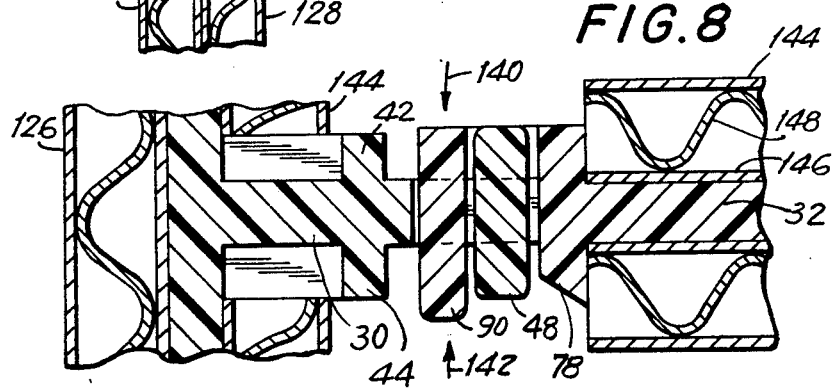
FIG. 8 is a fragmentary sectional view taken along the line 8—8 of FIG. 7.

The first member 30 is symmetrical and allows entry of the guide fingers 88,90,92,94 and flexing fingers 96,98 of the second member 32 from the direction shown by the arrow 140 or the arrow 142 shown in FIG. 8. This symmetry of the first member 30 enhances the versatility of the connector 12 and facilitates its application in structures of various configurations.

While the primary application of the connector 12 is for the structures which are formed of corrugated cardboard which as shown in FIG. 8 comprises a pair of face layers 144,146 which are glued to a corrugated layer 148, it is clear that the connector may be used with solid panels of various types such as wood, plastic or composition materials or with laminated panels such as foam core panels.

While a preferred embodiment of the invention has been shown and described herein, it is obvious that numerous additional changes and omissions may be made in such embodiment without departing from the spirit and scope of the invention.

What is claimed is:

1. A connector for corrugated materials comprising a first member, with said first member comprising a base portion and a projecting member having at least one aperture and a second member with said second member having a base portion and projecting finger means projecting from said base member and proportioned to removeably project into said aperture of said first member thereby locking said first and said second members together, in which said projecting finger means comprises at least one cantilever flexible finger means and at least one cantilever rigid finger means lying in the same plane and with the flexible finger means pivotable transversely out of said plane.

2. A connector for corrugated materials comprising a first member, with said first member comprising a base portion and a projecting member having at least one aperture and a second member with said second member having a base portion and projecting finger means projecting from said base portion and proportioned to removeably project into said aperture of said first member thereby locking said first and said second members together, in which said second member includes an aperture disposed proximate to said finger means with said aperture proportioned to receive said projecting member when first and said second members are engaged.

3. A connector for corrugated materials comprising a first member, with said first member comprising a base portion and a projecting member having at least one aperture and a second member with said second member having a base portion and projecting finger means projecting from said base portion in cantilever fashion and proportioned to removeably project into said aperture of said first member thereby locking said first and said second members together, with said projecting finger means comprising a pair of rigid finger means and a flexible finger means disposed between said rigid fingers, in the same plane thereof, and pivotable transverely out of said plane.

4. A connector for corrugated materials comprising a first member, with said first member comprising a base portion and a projecting member having at least one aperture and a second member with said second member having a base portion and projecting cantilever means projecting from said base portion and proportioned to removeably project into said aperture of said first member thereby locking said first and said second members together, with said first member including a pair of aligned apertures and with said second member comprising in one plane a first pair of rigid cantilever finger means and a first flexible cantilever finger means with said first pair of rigid finger means and said first flexible finger means capable of being recieved in a first of said apertures and with said second member further comprising in one plane a second pair of rigid cantilever finger means and a second flexible cantilever finger means with said second pair of rigid finger means and said second flexible finger means capable of being received in a second of said apertures and with said flexible finger means being pivotable transversely out of said planes.

5. A connector for corrugated materials according to claim 2 in which said base portion of said first member is substantially perpendicular to said projecting member.

6. A connector for corrugated materials according to claim 2 in which said base portion of said second member is substantially perpendicular to said finger means.

7. A connector for corrugated materials according to claim 2 in which said finger means comprises a hook portion disposed at the outer extremity of said finger means.

8. A connector for corrugated materials according to claim 2 in which said second member further comprises a wall portion projecting from said base member and disposed adjacent to said aperture.

9. A connector for corrugated materials according to claim 8 in which said wall portion projects perpendicularly from said base member.

10. A connector for corrugated materials according to claim 2 in which said first and second members are made of ABS plastic.

11. A connector for corrugated materials according to claim 2 in which said first and said second members are made of high impact polystyrene.

12. A connector for corrugated materials according to claim 2 in which said projecting finger means comprises at least two finger members and in which said projecting member on said first member has at least two apertures proportioned to receive said projecting fingers.

* * * * *